United States Patent

Bridwell et al.

[15] 3,652,993

[45] Mar. 28, 1972

[54] RAPID POLLING METHOD FOR DIGITAL COMMUNICATIONS NETWORK

[72] Inventors: John Dewey Bridwell, Little Silver; Donald van Zelm Wadsworth, Colts Neck, both of N.J.

[73] Assignee: Bell Telephone Laboratories, Incorporated, Murray Hill, Berkeley Heights, N.J.

[22] Filed: July 24, 1970

[21] Appl. No.: 58,002

[52] U.S. Cl. ....................................... 340/147 R, 340/163 R

[51] Int. Cl. .......................................... H04q 9/00, H04j 3/00

[58] Field of Search ......................................... 340/147, 163

[56] References Cited

UNITED STATES PATENTS 3,526,877 9/1970 Carlson et al. ......................... 340/147

3,483,329 12/1969 Hunkins et al. .................... 340/147 X

*Primary Examiner*—Donald J. Yusko

*Attorney*—R. J. Guenther and E. W. Adams, Jr.

[57] ABSTRACT

All of the remote stations to be rapidly polled are connected in a series loop with the control station, which transmits a rapid polling word containing several information bits followed by a marker bit. Each remote station, while retransmitting the word to the following station in the loop, advances the marker one or more bit positions and inserts its own status information in those positions. The remote stations recognize a full word by the position of the marker and ignore it. The remote stations may also be programmed to alter error checking parity bits in accordance with the alterations made in the information bits.

10 Claims, 5 Drawing Figures

INVENTORS J. D. BRIDWELL
D. V. Z. WADSWORTH
BY John P. Van Doren
ATTORNEY

RAPID POLLING METHOD FOR DIGITAL COMMUNICATIONS NETWORK

BACKGROUND OF THE INVENTION

This invention relates to digital telemetering communications networks having a control station and a number of remote stations. In particular, it relates to a method and apparatus for rapidly polling all or selected ones of the remote stations; that is, communicating with the remote stations to determine which need service or have a message to transmit.

Typically, such polling has been performed on an individual basis. The control station transmits the query addressed to an individual remote station. The individual remote station answers the query, and other stations, upon receiving the address, ignore the query. The control station in this manner calls each remote, one by one. In networks containing many remote stations, such individual polling takes considerable time. Two multidigit code words are usually required for polling each station, one for the remote address and the query, one for the control station address and the answer.

Because of the large amount of time required for polling, several systems have been devised which attempt to eliminate the need for all station polling. U.S. Pat. No. 2,982,809 that issued May 2, 1961 to Light et al., for example, discloses a system in which if the addressed station has no message, the query is automatically sent to the next station. According to the disclosure of a copending application by D. A. Kerr, of common assignee with this application, Ser. No. 842,537, filed July 17, 1969, the stations are connected in a series loop. Each station upon terminating its message transmission generates and transmits a polling code. The next station in the loop that has a message to transmit intercepts the polling code, seizes the loop and transmits its message. With all of these systems, however, it can still take a considerable amount of time for a remote station to be able to indicate to the control station that it has a message to transmit. Damage to equipment or loss of information can occur in this interval.

An object of this invention is the rapid polling of all of the remote stations.

Another object is the polling of several stations with a single code word.

Another object is the rapid polling of selected ones of the remote stations.

SUMMARY OF THE INVENTION

In order to accomplish rapid polling according to the invention, the stations are connected in a series loop and the control station transmits over the loop a polling code word that comprises information digits and a marker digit. Each remote station in turn, in the process of receiving and retransmitting the word, advances the marker one or more digit positions and inserts its answer to the poll into the digit positions traversed by the marker. In decoding the polling word, the control station determines which stations need service or have messages by the positions in the polling word of their respective information digits. For error checking, the control station may send at the end of the word parity digits that are related to the information digits by a linear code. Each remote station then calculates and applies alterations to the received parity digits that are related by the same code to the alterations it makes in the information digits. In this manner, the parity digits are altered in step with the information digits to remain correct throughout the traverse of the loop.

DETAILED DESCRIPTION

Figure 1:
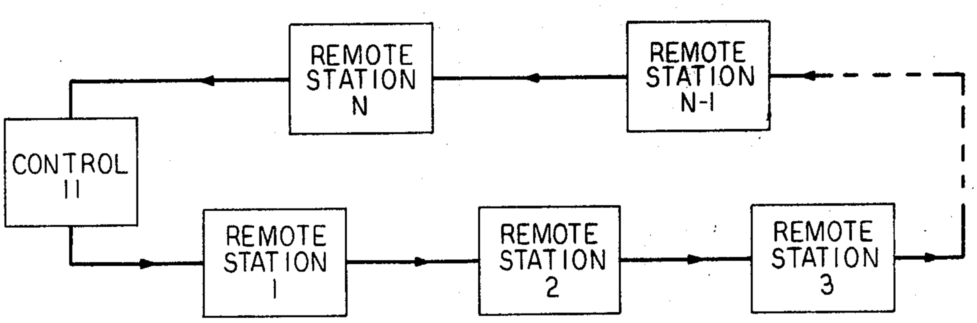
FIG. 1 is a block diagram illustrating a network connected in a series loop for practicing the invention.

The rapid polling method of the invention may be applied to a series loop connected digital transmission system such as that illustrated in block form in FIG. 1. A control station 11 is connected in a series loop with a plurality of remote stations 1, 2, 3...N–1, N. That is, the output of control station 11 is connected to the input of remote station 1; the output of remote station 1 is connected to the input of station 2; etc., with the output of station N connected to an input of control station 11. This being a digital system, the information transmitted between stations is in discrete pieces or digits. Several digits are transmitted successively to form code words. Physically, these digits may take any of several electrical forms. It is well known, for example, to use any of several pulse parameters to express the digits, such as amplitude, width or polarity. As another alternative, different frequencies or tones may represent the different digits. In a binary system, which is the simplest digital system, the digits are commonly called bits, short for BInary digiTS. Each bit has only two possible values, which are conveniently termed "1" and "0," respectively. A "1," therefore, may be represented by the presence of a pulse above a certain amplitude, or the presence of a certain frequency tone, and a "0" by the absence of a pulse or tone in an allotted time position. Each station is conditioned according to usual practice to respond to or "recognize" certain unique code words.

Figure 2:
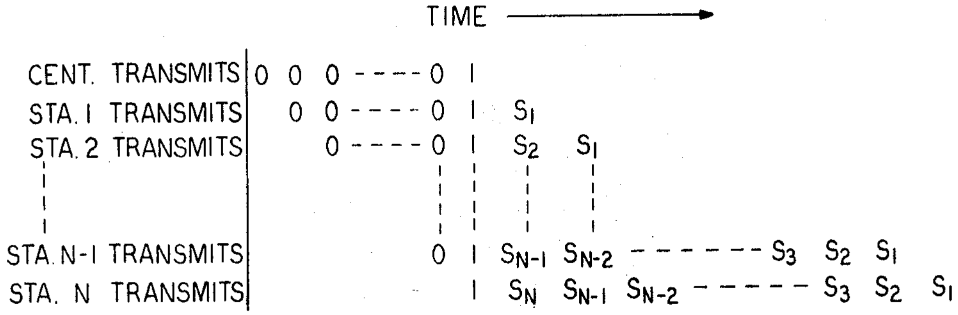
FIG. 2 is a table of rapid polling code words at successive stations in the loop of FIG. 1.

In accordance with the rapid polling method of the invention, the control station 11 transmits a rapid polling command that will be recognized by each remote station. The polling word itself may contain at its beginning the unique combination of digits that is recognized, or a separate command word may be recognized and the remote stations conditioned thereby to act on the polling word that follows. The rapid polling word that is next transmitted by the control station contains a number of information digits and a marker digit. The table of FIG. 2 shows a simplified rapid polling word as it traverses the loop of a binary system. The first line of the table represents the simplified word as it is transmitted by the central control station. The "1" bit at the end of the word is the marker bit. All of the "0" bits are information bits. Remote station 1, upon receiving the word discards the first bit and transmits the remaining bits to remote station 2. Upon transmitting the marker bit "1," it then generates its own information bit "$S_1$" indicative of its status, that is, its answer to the poll, and inserts it into the time slot immediately following the marker bit. Status bit "$S_1$" is, of course, a "1" or a "0" depending upon the information that station 1 has to communicate. The word received by remote station 2 is therefore that shown on the second line of FIG. 2. In a manner similar to remote station 1, remote station 2 discards the first digit of the word it receives and transmits the remaining digits. Upon transmitting the marker digit "1," station 2 inserts its status bit "$S_2$," and then transmits the remainder of the word. The word that station 2 transmits is illustrated on the third line. It will be noted that as the word progresses it continues to contain the same number of digits, and it is effectively delayed only one bit for each remote station. The marker bit, however, that separates the empty information bits from the status, or filled information bits, may be said to slide forward one bit at a time. Finally, when the polling word has passed through as many stations as there are information bits, it will be full, as the word shown on the last line of FIG. 2. It then starts with the marker bit, which can be recognized by all subsequent stations. Logic circuitry at the control station will recognize the returned code word and its marker bit. It can then correlate the status information with the corresponding remote stations by the position after the marker bit that the particular status bit occupies. Information as to the status of each remote station, hence polling of all of the remote stations can therefore be accomplished with the use of a single polling word and as little as two digits delay for each remote station.

Figure 3:
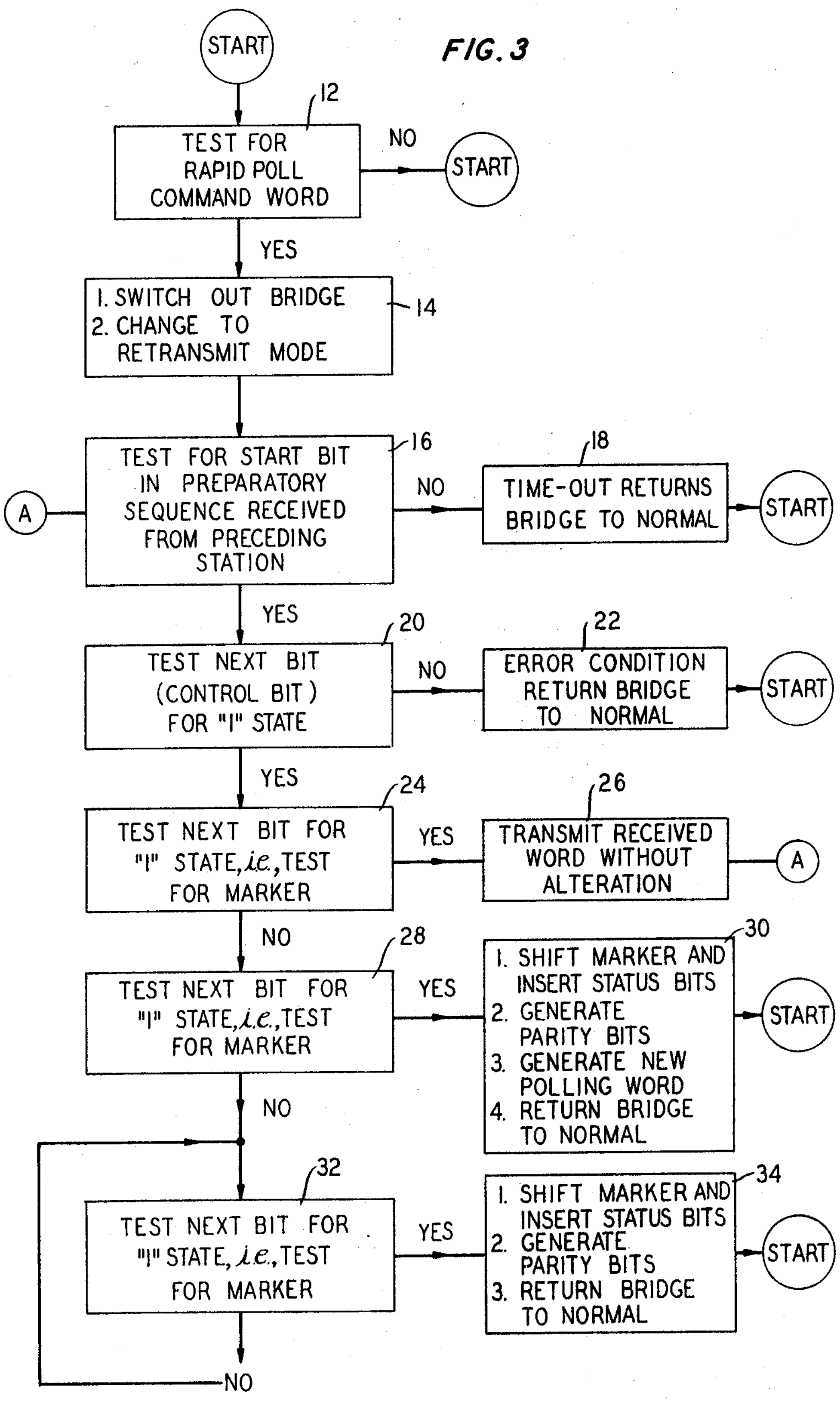
FIG. 3 is a logic diagram useful for programming remote stations to practice the invention.

A logic diagram useful for adapting the remote stations to operate on rapid polling words according to the method of the invention is shown in FIG. 3. The process defined by the logic diagram provides for the possibilities of (1) polling more remote stations than there are information bits in one rapid polling word, and (2) a mixture of remote stations with and without rapid polling circuitry. The logic may of course be implemented by a general purpose computer properly programmed to reflect the logic diagram, or by well-known logic circuits permanently wired to perform the indicated logic.

Figure 5:
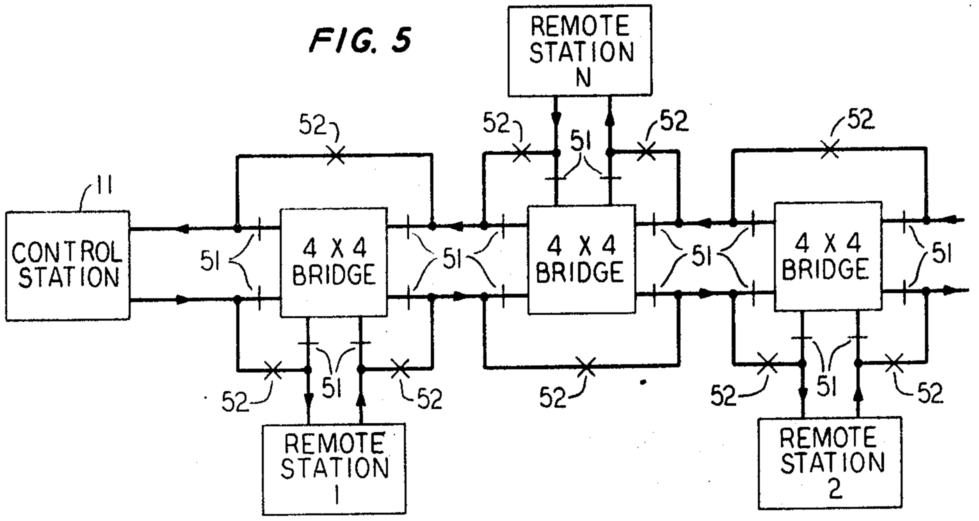
FIG. 5 is a partly block, partly schematic diagram illustrating the switch connections to convert a parallel connected network into a series loop for practicing the invention.
Figure 4:
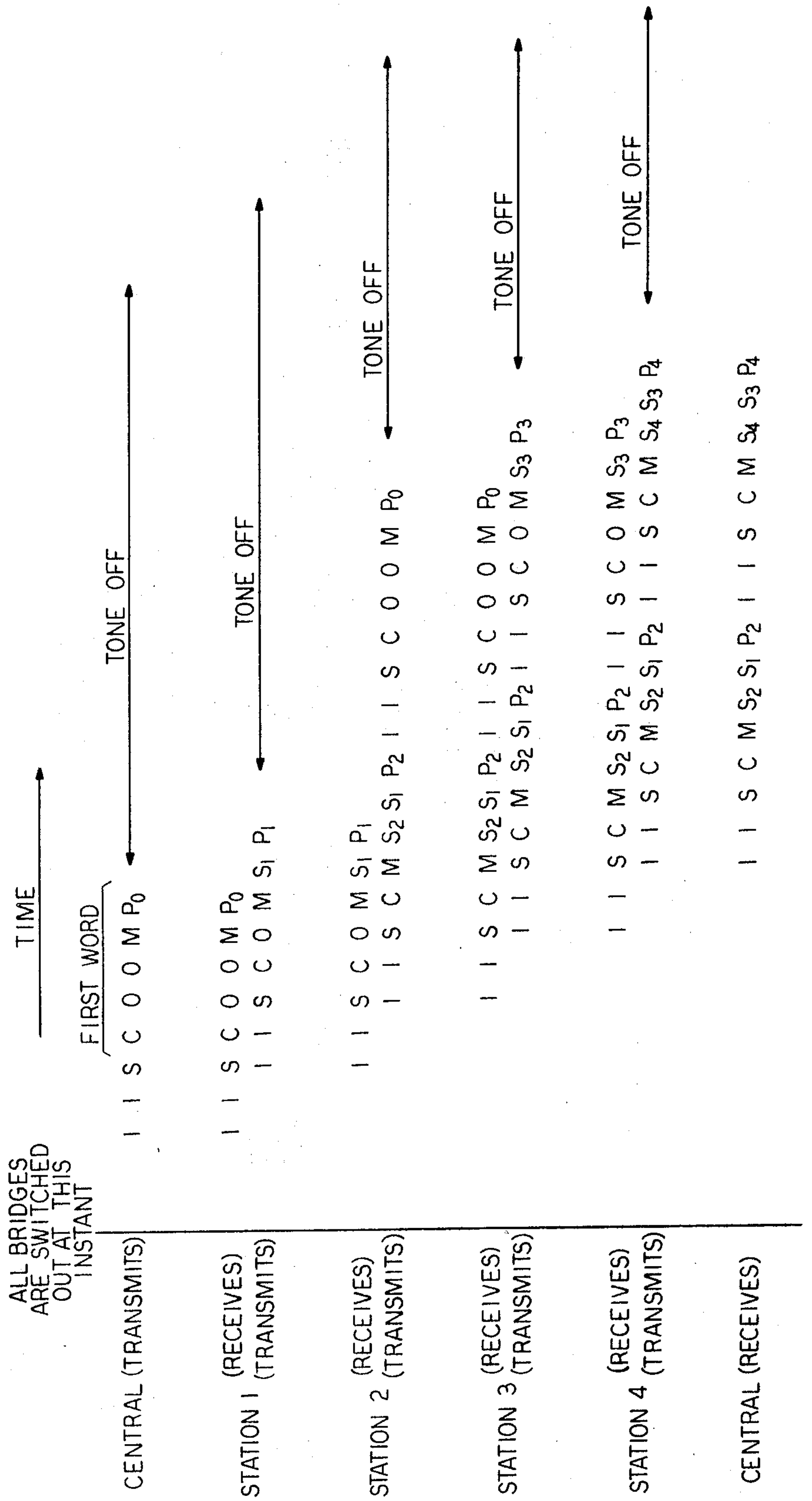
FIG. 4 is a table of rapid polling code words handled by stations programmed according to the program of FIG. 3.

The logic diagram of FIG. 3 presupposes that the remote stations are initially connected in parallel via a four-wire, four-way bridge as shown in FIG. 5. It is designed to use the rapid polling words that are shown in the table of FIG. 4. These words are similar to those of FIG. 2 with a few added features. They include a preparatory sequence of two "1's," a start bit "S," a control bit "C," empty information bits "0," a marker bit "M," filled information bits, or status bits "$S_i$," and parity bits for error checking "$P_i$." In order to illustrate the processing of a completely filled word, the rapid polling words of FIG. 4 have only two bits available for reporting the status of remote stations. In a practical system, of course, many more status bits could be used. Twenty-four bit words, for example, could contain seven parity bits and 15 status bits.

The first step, block 12 of the logic diagram of FIG. 3, is to test for the rapid polling command. Until the command is recognized, the remote station operates in its normal conversational mode. Upon recognition of the rapid polling command, each remote station performs the two operations of block 14. The parallel bridge is switched out to connect the station in series with the loop, and the station changes to a retransmit mode in which it retransmits the digits it receives after a fixed delay period. As can be seen from FIG. 4, in the system illustrated the delay period is two bits per station. One bit of delay is used up in the time it takes to retransmit each digit to the following station after receiving it from the preceding station. The other bit of delay is needed to insert one status bit at each station. Any additional status bits desired will each require an additional bit of delay.

The third logic step of FIG. 3, block 16, is a test for the start bit "S." This bit is, of course, a "0" to differentiate it from the preparatory sequence bits. If during a fixed period of time no start bit is received, the bridge returns to normal, block 18. When a start bit has been received during the allotted time, the station tests the next following bit for a control bit "C," block 20.

The control bit is useful when all remote stations are not equipped to respond to the rapid polling command. All stations may be programmed to respond to a "0" control bit in the first word of a command from the control station. Only those stations that are equipped for rapid polling may be programmed to respond to a "1" control bit in subsequent words. In this manner, stations that are not equipped to respond to the rapid polling command by switching into the series mode will properly ignore the rapid polling word that has a "1" control bit. Stations that do switch into the series mode and follow the logic diagram of FIG. 3 will continue only on finding a "1" control bit. Should the rapid polling word contain a "0" control bit, the remote station senses an error, block 22, and returns its bridge to normal.

Those stations that do respond to the "1" control bit, test the next following digit of the rapid poll word for the marker bit "M," block 24. If the digit following the control bit is a marker, that is, if it is a "1," all of the information bits of the word have been filled and none is available for inserting status. The received word is therefore transmitted without alteration, block 26, and the station returns to block 16 to test the next word for a start bit. The symbols A in FIG. 3 indicate a logic connection from block 26 to block 16. The inclusion of this step in the logic sequence allows rapid polling of more remote stations than there are information bits in the rapid polling word by providing for the handling of more than one word.

If the digit following the control bit is not a "1," the logic circuit tests the following bit, block 28. If this bit is a "1," there is only one information bit left unfilled, and the station performs four operations, block 30. First, it advances the marker one bit and inserts its status bit. It then generates a new set of parity bits compatible with the word as altered by the insertion of the status. Because the word is now filled it generates a new rapid polling word, and finally it returns its bridge to normal. The new word is operated on by the following stations after they retransmit the old word unaltered as previously discussed.

In the event that the "1" marker bit is not one of the first two digits following the control bit, there is more than one unfilled information bit left, and the station proceeds directly to block 32. According to this block, the station tests each succeeding bit until the marker is found. Upon finding the marker, the station proceeds according to block 34 to shift the marker ahead, insert its status bit, generate new compatible parity bits and return its bridge to normal.

With each remote station programmed according to the program of FIG. 3, therefore, little of the flexibility of individual polling is lost. There is no limit to the number of stations that may be polled; the stations may be arranged in any configuration such as a treelike structure or a loop; some of the stations in a network may be excluded from rapid polling; and the network may be restructured without reprogramming the remote stations. The remotes do not have to know in which direction the central control station lies, or by how many stations they are separated from central, and the number of status bits used by any remote station can be easily changed by a single change in that station's program.

With all of this flexibility, a timesaving of 10 to 1 can be achieved easily. One typical system uses words of 17 information bits and seven parity bits. Assuming six bits for preparation and the start bit, standard individual station polling requires 17+7+6=30 bits for each query and answer, or a total of 60 bits for polling each station. For 15 stations, therefore, 900 bits are required. With the rapid polling method of this invention, there is a two-word overhead [2(17+7+6)=60], plus a two-bit delay per station [+2×15=30]; a total of only 90 bits required for polling all 15 stations.

The circuit diagram of FIG. 5 illustrates contact connections that may be utilized to switch out the individual bridges and accomplish the transfer between parallel and series loop connections. In this diagram, each line represents a two-conductor pair with transmission in the direction indicated by the arrows. Upon recognition of the rapid polling command, each remote station opens its normally closed contacts 51 and closes its normally open contacts 52. Successive stations may be connected alternately to the outgoing and returning lines as shown to improve line balance.

The process of sending parity bits for error checking is, of course, well known. It is particularly useful for maintaining message security and even necessary for maintaining effective data communications over a noisy communication channel. In a normal conversational mode between two data stations, the sending station, while sending the information part of a data word, calculates parity bits based on the particular information bits according to an algorithm or code. It then sends these parity bits at the end of the information bits as part of the same word. The receiving station, while receiving the information bits, calculates its own parity bits according to the same code and compares the calculated parity bits with the received bits. Any discrepancy indicates an error, and the receiving station may be programmed to ignore the word.

The rapid polling method of this invention, as indicated by the program of FIG. 3, can also utilize such an error detection process if the parity code is linear, as for instance the well-known Bose-Chaudhuri-Hocquenghem code. With a linear code, if two words are added together bit by bit, the error detecting parity bits may be likewise added together bit by bit;

the resulting parity bits are correct for the resulting information bits. In carrying out the rapid polling process of the invention, therefore, the control station may calculate and send parity bits that are related to the information part of the rapid polling word as initially generated according to a linear code. As each remote station alters the rapid polling word as previously discussed, it calculates and applies a corresponding alteration for the parity bits. The alteration in the information part of the rapid polling word may be considered to be that word which, if added to the word as received, produces the word as transmitted to the next station. For example, if the word received by a remote station is 1000000101001100, and the word transmitted by that station to the next station is 1000001001001100, the word alteration is the difference:

| | |
|---|---|
| Received | 1 0 0 0 0 0 0 1 0 1 0 0 1 1 0 0 |
| Transmitted | 1 0 0 0 0 0 1 0 0 1 0 0 1 1 0 0 |
| Alteration | 0 0 0 0 0 0 1 1 0 0 0 0 0 0 0 0 |

The proper parity alteration is calculated from the word alteration and added to the received parity to produce the parity that is transmitted to the next station. In this manner, the parity bits properly match the information bits between stations in the rapid poll. While the remote stations are operating in this rapid polling mode they do not attempt to check the parity of the received word; they merely accept the complete word as received and leave the error checking to the control station.

What is claimed is:

1. A method for rapid polling a plurality of remote stations interconnected in a digital communications network with a control station comprising the steps of connecting said control station and said remote stations in a series loop so that each station receives from one immediately adjacent station and transmits to its other immediately adjacent station, transmitting from said control station via said series loop a multidigit polling word comprising a plurality of information digits and a marker digit, altering said polling word at each of said plurality of remote stations by advancing said marker digit a predetermined number of digit positions and inserting information into the digit positions traversed by said marker digit, transmitting the polling word thereby altered to the next station in the series loop, and receiving and decoding said rapid polling word at said control station after it has been altered successively by each of said plurality of remote stations in the course of traversing said series loop.

2. A method as in claim 1 including prior to the step of connecting said control station and said remote stations in a series loop, the step of sending a preliminary rapid polling command from said control station wherein said step of connecting said control station and said remote stations in a series loop is accomplished by said remote stations in response to said rapid polling command.

3. A method as in claim 1 wherein said predetermined number of digit positions traversed by said marker digit at each of said plurality of remote stations is one.

4. A method as in claim 1 wherein said predetermined number of digit positions traversed by said marker digit is different for at least two different ones of said plurality of said remote stations.

5. A method as in claim 1 including the steps of transmitting from said control station after said marker digit a multidigit parity sequence related to said polling word by a linear code, altering said parity sequence at each of said plurality of remote stations, the parity sequence alteration being related by said linear code to the polling word alteration applied by said each remote station, and comparing at said control station a new parity sequence related by said linear code to said altered polling word after it has traversed said loop with said altered parity sequence to detect errors.

6. A method for rapid polling selected ones of a plurality of remote stations interconnected in a digital communications network with a control station comprising the steps of said control station transmitting to each of said plurality of remote stations a preliminary rapid polling command, said selected ones of said plurality of remote stations connecting themselves into a series loop with said control station in response to said rapid polling command, said control station transmitting via said series loop a multidigit polling word comprising a plurality of information digits and a marker digit, said plurality of remote stations other than said selected ones ignoring said rapid polling word, each of said selected ones of said preselected remote stations in succession receiving said polling word, altering said polling word by advancing said marker digit a predetermined number of digit positions and inserting information into the digit positions traversed by said marker digit, and transmitting said altered polling word, and said control station receiving and decoding said rapid polling word after it has been altered successively by each of said selected ones of said plurality of remote stations in the course of traversing said loop.

7. A method for a remote station of a digital communication network to respond to a received polling inquiry with a minimum of network delay comprising the steps of testing in sequence each digit of said received polling inquiry for a marker digit, retransmitting after a delay of a predetermined number of digits each digit received until said marker digit is received, retransmitting said marker digit with a delay of less than said predetermined number of digits, transmitting at least one digit indicative of the response to said polling inquiry, and retransmitting each digit received after said marker digit.

8. A method as in claim 7 including before the step of testing each digit of said received polling inquiry for a marker digit, the steps of testing each received word for a rapid polling command, upon recognizing said rapid polling command, switching into a series loop configuration, changing into a retransmit mode so that each digit received is retransmitted after a delay of said predetermined number of digits, testing each received digit for a start digit, and upon finding a start digit testing the following received digit for a control digit.

9. A method as in claim 8 including the steps of upon finding the said marker digit immediately following the said control digit of retransmitting the said received polling inquiry without alteration, and repeating the steps of claim 8 that follow the step of changing to a retransmit mode.

10. A method as in claim 8 including the step of upon finding the said marker digit in the position a second predetermined number of digits after the said control digit generating and transmitting an additional rapid polling word after retransmitting said last received digit.

* * * * *